3,384,452
PROCESS FOR THE MANUFACTURE OF SODIUM TRIPOLYPHOSPHATE HEXAHYDRATE
Gero Heymer, Knapsack, near Cologne, Heinz Harnisch, Lovenich, near Cologne, and Joseph Cremer, Hermulheim, near Cologne, Germany, and Kurt Willi Harri Kribbe, deceased, late of Knapsack, near Cologne, Germany, by Gertrud Katharina Kribbe, nee Hanhardt, Knapsack, near Cologne, Heinrich Kribbe, Brakel, near Hoxter, and Edith Kribbe, nee Kuhrt, Brakel, near Hoxter, Germany, heirs, assignors to Knapsack Aktiengesellschaft, Knapsack, near Cologne, Germany, a corporation of Germany
No Drawing. Filed June 7, 1965, Ser. No. 463,470
Claims priority, application Germany, June 25, 1964, K 53,323
12 Claims. (Cl. 23—106)

ABSTRACT OF THE DISCLOSURE

A process for directly converting Form I and Form II sodium tripolyphosphate crystals to the corresponding hexahydrate by spraying the crystals with a stoichiometric excess up to 30% of water at 0–60° C. and simultaneously passing a substantially inert gas stream over the reaction mixture to maintain a temperature of about 50°–80° C.

---

The present invention is concerned with a process for the manufacture of sodium tripolyphosphate hexahydrate, wherein water in an excess proportion, related to the quantity theoretically necessary for hexahydrate formation, is nozzle-sprayed onto anhydrous sodium tripolyphosphate kept in motion.

As sodium tripolyphosphate is almost exclusively produced in commercial quantities by subjecting primary and secondary orthophosphates to condensation with elimination of water, sodium tripolyphosphate hexahydrate will usually be prepared through the intermediate anhydrous sodium tripolyphosphate salt stage. Various attempts have been made heretofore to additively combine sodium tripolyphosphate with water. Thus, for example, it is known that anhydrous sodium tripolyphosphate in powder form can be dissolved in water and the resulting solution subjected to various treatment methods for decreasing the solubility thereof, e.g. salted out with sodium chloride or admixed with an organic solvent miscible with water or subjected to vacuum evaporation to eliminate water in excess and to thereby cause the hexahydrate to precipitate or crystallize out. Evaporating the water at atmospheric pressure is impossible because the tripolyphosphate will then be subject to rather appreciable hydrolysis. The other treatment methods mentioned above also incur partial decomposition of the tripolyphosphate into pyro- and orthophosphates. Still further, all of these processing methods are expensive because the precipitated hexahydrate must be filtered, dried and eventually ground, and the mother liquor must be worked up.

Attempts have therefore been made to produce tripolyphosphate hexahydrate by admixing anhydrous tripolyphosphate accurately with the quantity of water stoichiometrically necessary to that effect and directly producing a crystallized solid product in a heterogeneous solid-liquid reaction. In this process, the necessary quantity of water is nozzle-sprayed onto the anhydrous tripolyphosphate kept in slight motion. While this method offers considerable energetic advantages and incurs much lesser process steps as compared with the other processes mentioned above, it also has some inherent disadvantages. The heat of hydration causes the temperature in the reaction mass to increase to approximately 100° C. with a portion of the tripolyphosphate becoming decomposed hydrolytically into pyrophosphate and orthophosphate. On the other hand, formation of hexahydrate crystals is accompanied by a ready tendency of the powder to lump formation which often requires successive grinding. This phenomenon and the violent reaction substantially destroy any low density beads in the tripolyphosphate of the type preferred today. In other words, tight and heavy powder will be formed corresponding in type and nature to the powder obtained by any of the above processes by causing tripolyphosphate hexahydrate to crystallize out of excess water.

It has also been attempted to weaken the violence of the hydration reaction by admixing the tripolyphosphate with water in the solid state, i.e. with ice. On melting, the ice produced some sort of internal cooling so that the reaction temperature was lowered and the reaction time prolonged. Hydrolytic decomposition of the tripolyphosphate was thereby appreciably reduced, but this method also is not fully satisfactory. Apart from the fact that producing ice and admixing it while solid with tripolyphosphate is less economic than the use of water, the components are less adequately mixed with the tripolyphosphate than effected by using a water spray, and the resulting product is less uniform than obtained by water spraying. If the reaction mass is intensely agitated to improve mixing, the light weight, thin-walled hollow beads of the tripolyphosphate become partially smashed by the heavier lumpy ice with an undesired increase in the apparent density of the product.

The present invention now provides a process which obviates all of the disadvantages mentioned above and simultaneously can be carried out under substantially more economic conditions, wherein water having a temperature of 0 to 60° C., preferably 5 to 15° C., is sprayed in an excess proportion, related to the quantity theoretically necessary for hexahydrate formation, onto Form I (formed at high temperature) or Form II (formed at low temperature) sodium tripolyphosphate kept in motion. Preferably a fine mist of water is sprayed onto the sodium tripolyphosphate. A stream of gas, e.g. air, is caused to flow concurrently therewith over the water sprayed sodium tripolyphosphate (reaction material) to evaporate water in excess. The quantity of water, which is used in an excess proportion, and the gas stream are adapted to each other so as to ensure that the latent heat of evaporation of the water is sufficient to maintain the reaction material at a temperature of 50–80° C., preferably 60–70° C. The water should conveniently be used in an excess proportion of up to 30%, and preferably in an excess proportion of 10–25%.

As already mentioned above, the reaction material should not be allowed to exceed a temperature of approximately 80° C. so as to obviate hydrolysis. If the reaction is incomplete at that temperature for a given time of residence of the reaction material in the reaction apparatus, it is possible to appropriately increase the reaction velocity by increasing the sodium tripolyphosphate crystal Form I proportion or high temperature modification, which has a hydration velocity greater than the sodium tripolyphosphate Form II or low temperature modification, contained in the anhydrous tripolyphosphate used as the starting material. An increased hydration velocity may however produce a local temperature increase, and appropriate steps, e.g. spraying and evaporation of a larger excess of water, must then be taken to prevent this. Products prepared in the manner described above are free from any tendency to lump formation even during prolonged storage in any moist atmosphere and preserve their good flow properties.

The reaction material is kept in motion by carrying out the hydration in a rotary tube or by applying the principles of a fluidized bed to the sodium tripolyphosphate.

It is known that especially anhydrous tripolyphosphate of low apparent density consists of particles shaped as hollow beads.

We have now unexpectedly found that despite the intense mixing the reaction material undergoes and despite the uniform reaction all the starting material thereby undergoes, the process of the present invention enables the hollow bead structure of the particles to be essentially preserved. This is an unexpected result because the tripolyphosphate crystal lattice is known to accept 6 molecules $H_2O$ per molecule $Na_5P_3O_{10}$ and to transform into the completely different crystal lattice of tripolyphosphate hexahydrate. In other words, a topochemical reaction is concerned.

This means another advantage for the process of the present invention, viz the production of sodium tripolyphosphate hexahydrate having a determined apparent density by using anhydrous sodium tripolyphosphate as the starting material which has an apparent density approaching that desired for the product to be prepared. In this manner, hexahydrate having an apparent density of 0.35 to 1.00 kg./l. can be prepared depending on whether the starting material has a massive or hollow bead structure. The apparent density of the hexahydrate obtained in the form of hollow beads can be increased, if necessary, by subjecting the material to grinding to wholly or partially destroy the hollow beads. However, it will generally be attempted to preserve the hollow bead structure of the hexahydrate particles and to prevent the particles from sticking together so as to obtain a free-flowing product.

Care must be taken to ensure that the hydration reaction is complete before the product is discharged into any container to be stored therein. Failing this, the last portion of the reaction takes place in the resting mass possibly compressed under its own weight, i.e. agglutination of the particles can then by no means be obviated. It is therefore a further feature of the present invention to so adapt reaction velocity, reaction temperature and time of residence of the reaction material in the reaction apparatus to each other that the reacting mass be kept in permanent motion for a time sufficient to ensure complete hydration yielding the hexahydrate. In other words, product withdrawn from the reactor merely contains water of hydration but it is free from adhering water.

The present invention is more especially concerned with a process for the manufacture of sodium tripolyphosphate hexahydrate by spraying water onto anhydrous sodium tripolyphosphate, kept in motion, which comprises spraying a fine mist of water onto Form I and/or Form II sodium tripolyphosphate, which is preferably used in powder form, the water having a temperature of about 0 to 60° C., preferably about 5 to 15° C., and being used in an excess proportion, related to the quantity of water theoretically necessary for hexahydrate formation, evaporating water in excess by causing a stream of gas, e.g. air, to flow concurrently therewith over the water-sprayed sodium tripolyphosphate, and by appropriately adapting the excess proportion of water to the gas stream using latent water evaporation heat for maintaining the water-sprayed sodium tripolyphosphate at a temperature of about 50 to 80° C., preferably at about 60 to 70° C.

In accordance with the present invention, the water is used in an excess proportion of up to about 30%, preferably in an excess proportion of 10 to 25%. The reaction velocity can be varied by varying the ratio of Form I to Form II sodium tripolyphosphate in the feed sodium tripolyphosphate, the reaction velocity being increased by increasing the proportion of Form I sodium tripolyphosphate in the feed sodium tripolyphosphate. The material to be hydrated is kept in motion by carrying out the hydration in a rotary tube or by applying the principles of a fluidized bed. The present invention permits making a final product having a determined apparent density by using sodium tripolyphosphate as the starting material which has an apparent density approaching that desired for the final product. The sodium triployphosphate used as the starting material may consist of particles shaped as hollow beads. The material to undergo hydration is kept in permanent motion until the hydration is complete and thereafter the hydrated product is packed and stored.

The following examples serve to illustrate the invention:

Example 1

260 kg./hr. sodium tripolyphosphate having an apparent density of 0.70 kg./liter and containing Form I tripolyphosphate in a proportion of 45% were uniformly metered with the help of a vibrating groove and a tape weigher into a rotary tube in which 93 liter/hr. water were simultaneously sprayed through a spraying nozzle into a fine water mist. The heat of hydration caused the temperature of the reaction material, which was vigorously agitated, to increase to 70° C. which was maintained constant by evaporating the water in excess. After 15 minutes, product which still felt slightly moist was removed from the rotary tube and placed into a second heat-insulated rotary tube in which it was allowed to remain for 30 minutes to be then removed at a temperature of 66° C. as an externally completely dry powder. Immediately thereafter, the powder withdrawn was passed through a mill and sacked. The final product had an apparent density of 0.72 kg./liter and a water content of 22.6% (theoretical water content: 22.7%). Paper chromatographic analysis indicated 98% tripolyphosphate (related to the total $P_2O_5$-content), i.e. a value unchanged with respect to the starting product. In a 14 hours test, the hexahydrate sacked averaged 332 kg./hr., corresponding to a yield of 98.5% of the theoretical. After 14 days storage, the product was free from lumps and had unchanged good flow properties.

Example 2

320 kg./hr. of an especially light weight sodium tripolyphosphate having an apparent density of 0.43 kg./liter and containing Form I sodium tripolyphosphate in a proportion of about 30% were metered in a manner analogous to that described in Example 1 into a rotary tube in which 101 liters water were atomized per hour through two spray nozzles into a fine water mist. The temperature of the mixture, which was agitated, rose to 65° C. which was maintained constant by evaporating the water in excess. The material was allowed to remain in the tube for a period of 15 minutes and externally dry product was then supplied to a second rotary tube free of heat insulation, from which it was removed after a further 30 minutes at a temperature of about 40° C. Immediately thereafter, the product was passed through a vibrating screen having meshes 1 mm. wide. Particles having a diameter larger than 1 mm. which formed during the reaction in a proportion of about 3 to 4% were screened out and ground. The final product consisted of particles having a diameter smaller than 1 mm. and was sacked. The product had an apparent density of 0.42 kg./liter and a water content of 22.7% which corresponded to the theoretical value. A paper chromatogram indicated a content of 98.5% tripolyphosphate (related to the total $P_2O_5$-content). In a 6 hours test, the sacked material averaged 389 kg./hr. tripolyphosphate hexahydrate having a particle size smaller than 1 mm., and 14 kg./hr. material consisting of particles having a size larger than 1 mm. were screened out, collected and ground. This corresponded to a total yield of 97.5% of the theoretical. The product sacked had excellent flow properties which remained unchanged even after storage for 14 days. 30-power microscopic investigation indicated that the particles had an outer appearance approximately identical with that of the starting material, save that the shell of the hollow beads had become slightly rougher. X-ray goniometric photographs indicated that the powder was free from unhydrated tripolyphosphate of either Form I or Form II.

We claim:
1. In the process for the manufacture of sodium tripolyphosphate hexahydrate by spraying water onto anhydrous sodium tripolyphosphate, the improvement comprising spraying a fine mist of water at a temperature of about 0–60° C. onto Form I sodium tripolyphosphate or Form II sodium tripolyphosphate, respectively, in up to 30% stoichiometric excess, and maintaining the sprayed sodium tripolyphosphate at a temperature of about 50–80° C. by simultaneously passing a gas stream over the sodium tripolyphosphate.
2. The process of claim 1 wherein pulverulent sodium tripolyphosphate is used.
3. The process of claim 1 wherein water is used in a stoichiometric excess of 10 to 25%.
4. The process of claim 1 wherein the water has a temperature of about 5 to 15° C.
5. The process of claim 1 wherein air is used as the gas stream.
6. The process of claim 1 wherein the water-sprayed sodium tripolyphosphate is maintained at a temperature of about 60 to 70° C.
7. The process of claim 1 wherein the speed of reaction is controlled by varying the ratio of Form I to Form II sodium tripolyphosphate.
8. The process of claim 1 wherein the water-sprayed sodium tripolyphosphate is agitated in a rotary tube.
9. The process of claim 1 wherein the water-sprayed sodium tripolyphosphate is agitated in a fluidized bed.
10. The process of claim 1 wherein the sodium tripolyphosphate utilized as starting material which has an apparent density approximating that of the desired final product.
11. The process of claim 1 wherein the sodium tripolyphosphate starting material consists essentially of particles shaped like hollow beads.
12. The process of claim 1 wherein the water-sprayed sodium tripolyphosphate is agitated to effect complete hydration.

References Cited

UNITED STATES PATENTS 3,046,092   7/1962   Montague ---------- 23—106

FOREIGN PATENTS 609,785   10/1948   Great Britain.

OSCAR R. VERTIZ, *Primary Examiner.*

MILTON WEISSMAN, *Examiner.*

L. A. MARSH, *Assistant Examiner.*